US011523095B2

(12) United States Patent
Kirillov (10) Patent No.: US 11,523,095 B2
(45) Date of Patent: Dec. 6, 2022

(54) MEMS MIRROR-BASED EXTENDED REALITY PROJECTION WITH EYE-TRACKING

(71) Applicant: Infineon Technologies AG, Neubiberg (DE)

(72) Inventor: Boris Kirillov, Judendorf-Straßenge (AT)

(73) Assignee: Infineon Technologies AG, Neubiberg (DE)

( * ) Notice: Subject to any disclaimer, the term of this patent is extended or adjusted under 35 U.S.C. 154(b) by 66 days.

(21) Appl. No.: 17/128,976

(22) Filed: Dec. 21, 2020

(65) Prior Publication Data
US 2022/0201264 A1    Jun. 23, 2022

(51) Int. Cl.
| | |
|---|---|
| H04N 9/31 | (2006.01) |
| G02B 6/08 | (2006.01) |
| G02B 26/10 | (2006.01) |
| G06F 3/01 | (2006.01) |
| G02B 26/08 | (2006.01) |
| G02B 27/00 | (2006.01) |
| G06V 40/19 | (2022.01) |
| G06V 40/18 | (2022.01) |

(52) U.S. Cl.
CPC ....... *H04N 9/3188* (2013.01); *G02B 26/0833* (2013.01); *G02B 26/101* (2013.01); *G02B 27/0093* (2013.01); *G06F 3/013* (2013.01); *G06V 40/19* (2022.01); *G06V 40/193* (2022.01); *H04N 9/3152* (2013.01)

(58) Field of Classification Search
None
See application file for complete search history.

(56) References Cited

U.S. PATENT DOCUMENTS

| | | | |
|---|---|---|---|
| 8,945,197 B1 * | 2/2015 | Friend | A61N 5/06 607/88 |
| 8,956,396 B1 * | 2/2015 | Friend | A61N 5/0622 607/88 |
| 2003/0209893 A1 * | 11/2003 | Breed | B60R 21/01536 701/45 |

(Continued)

OTHER PUBLICATIONS

"The Importance of Eye Tracking in Augmented Reality (AR) and Virtual Reality (VR)." 2018 Moor Insights & Strategy, Jun. 2018, pp. 1-14.

*Primary Examiner* — Talha M Nawaz
(74) *Attorney, Agent, or Firm* — Harrity & Harrity, LLP (57) ABSTRACT

An image projection system includes a first transmitter configured transmit pixel light pulses along a transmission path to be projected onto an eye to render a projection image thereon; a second transmitter configured to generate infrared (IR) light pulses transmitted along the transmission path to be projected onto the eye and reflected back therefrom as reflected IR light pulses on a reception path; a coaxial scanning system arranged along the transmission and reception paths; an eye-tracking sensor configured to generate a retina image of the eye based on reflected IR light pulses, and process the retina image to determine a fovea region location of the eye; and a system controller configured to render the projection image based on the fovea region location, wherein the projection image is rendered with a higher resolution in the fovea region and is rendered with a lower resolution outside of the fovea region.

22 Claims, 4 Drawing Sheets

(56) References Cited

U.S. PATENT DOCUMENTS

| | | | |
|---|---|---|---|
| 2004/0129478 A1* | 7/2004 | Breed | G01S 17/88 180/273 |
| 2005/0046584 A1* | 3/2005 | Breed | B60R 21/01536 340/13.31 |
| 2006/0208169 A1* | 9/2006 | Breed | G01S 7/4802 250/221 |
| 2014/0232736 A1* | 8/2014 | Abele | B60K 35/00 345/589 |
| 2021/0231963 A1* | 7/2021 | Janes | G02B 27/0172 |

* cited by examiner

MEMS MIRROR-BASED EXTENDED REALITY PROJECTION WITH EYE-TRACKING

BACKGROUND

Augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eyeglasses, smart contact lenses, head-up displays (HUDs), and head-mounted displays (HMDs), or projected directly onto a user's retina, as is the case for virtual retinal displays.

Virtual reality (VR) is a technology that entirely replaces the real world environment of a user with a computer-generated virtual environment. Thus, a user is presented with a completely digital environment. In particular, computer-generated stereo visuals entirely surround the user. In a VR simulated environment, a VR headset that provides 360 degree vision may be used.

A mixed reality (MR) experience combines elements of both AR and VR such that real-world and digital objects interact. Here, a real world environment is blended with a virtual one. In addition to the aforementioned technologies, a hololens may be used to provide an MR environment to a user.

These technologies, as well as others that enhance a user's senses, may be referred to as extended reality (XR) technologies.

In order to enhance a user experience in an XR technology, it may be beneficial to implement eye-tracking to track a direction a user is looking.

SUMMARY

One or more embodiments provide an image projection system that includes a first transmitter configured to generate pixel light pulses and transmit the pixel light pulses along a transmission path to be projected onto an eye to render a projection image thereon; a second transmitter configured to generate infrared (IR) light pulses transmitted along the transmission path and to be projected onto the eye and reflected back therefrom as reflected IR light pulses on a reception path; a coaxial scanning system arranged along the transmission path and the reception path, the coaxial scanning system including at least one oscillator structure that enables the coaxial scanning system to steer the pixel light pulses and the IR light pulses in a first scanning direction and in a second scanning direction according to a scanning pattern; an eye-tracking sensor configured to receive the reflected IR light pulses from the coaxial scanning system, generate a retina image of the eye based on the reflected IR light pulses, and process the retina image to determine a location of a fovea region of the eye; and a system controller configured render the projection image based on the location of the fovea region, wherein the projection image is rendered with a higher resolution in the fovea region and is rendered with a lower resolution outside of the fovea region.

One or more embodiments provide a method of projecting an image based on fovea tracking. The method includes transmitting pixel light pulses along a transmission path to be projected onto an eye to render a projection image thereon; transmitting infrared (IR) light pulses along the transmission path, the IR light pulses being projected onto the eye and reflected back therefrom as reflected IR light pulses on a reception path; steering the pixel light pulses and the IR light pulses in a first scanning direction and in a second scanning direction according to a scanning pattern; sensing the reflected IR light pulses received from the reception path; generating a retina image of the eye based on the reflected IR light pulses; processing the retina image to determine a location of a fovea region of the eye; and rendering the projection image based on the location of the fovea region, wherein the projection image is rendered with a higher resolution in the fovea region and is rendered with a lower resolution outside of the fovea region.

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light (VL), infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In the field of extended reality (XR) technologies, a sensor may be used for eye-tracking to detect and track a direction in which a user is looking. Doing so may allow the XR system to use foveated rendering, a technique that shifts a high-detailed region of an image to coincide with a projection onto the fovea. Dynamic foveated rendering follows the user's focal direction (i.e., a user's gaze) in real-time using eye-tracking or gaze-tracking and renders a sharp image wherever the user's retinas are looking rather than at any fixed location. Embodiments disclosed herein are directed to detecting and tracking an eye direction (i.e., a focal direction), and, more particularly, to detection and tracking a fovea position of a user's eye in order to compensate a scanning operation of a scanning system. Based on the detected focal direction and/or the detected fovea position, a system controller is configured to adjust one or more system parameters, including: a scanning frequency of a scanning structure, a scanning pattern, a light pulse emission time of an red-green-blue (RGB) projection, and/or a beam width of an RGB projection.

Figure 1:
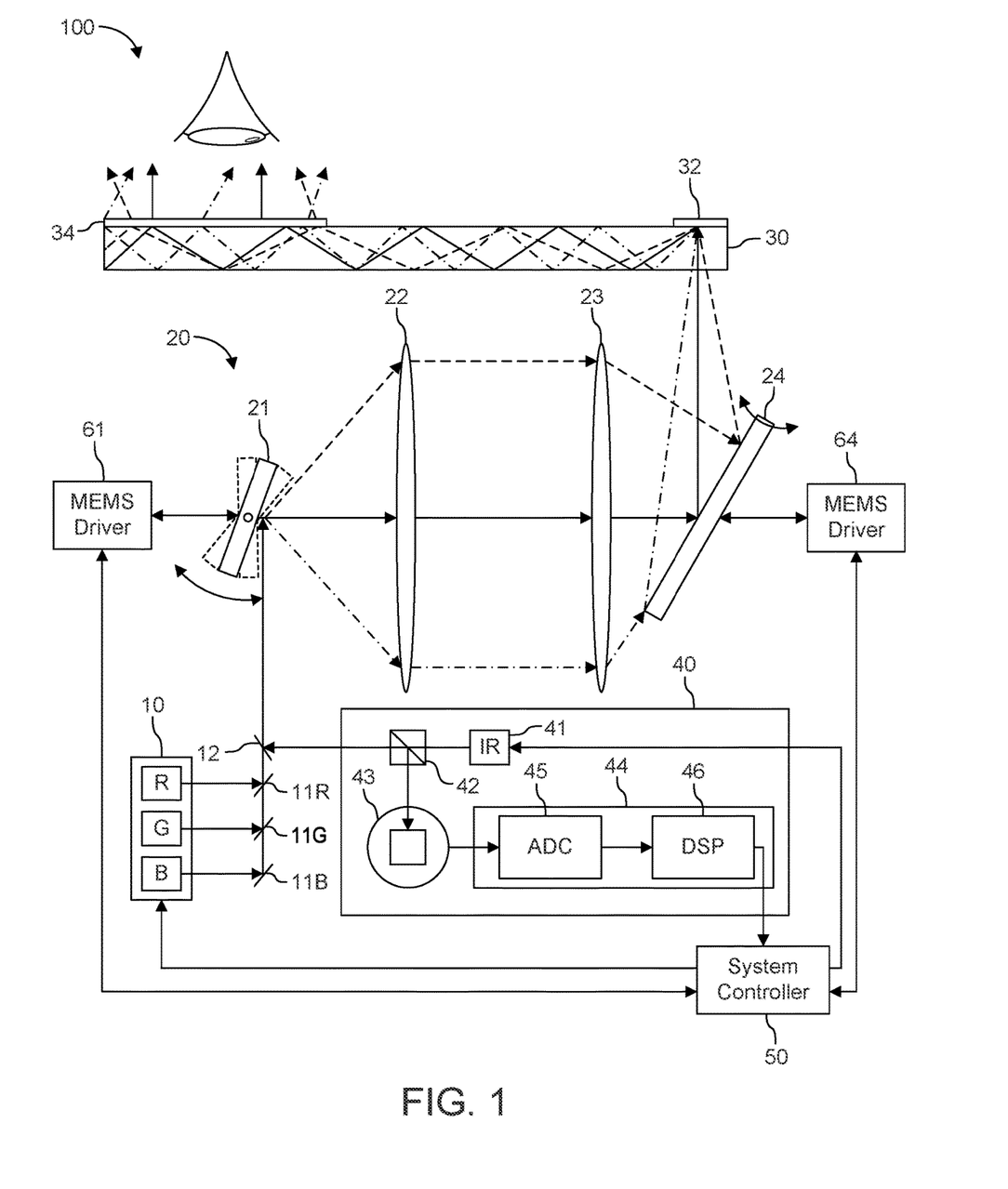
FIG. 1 is a schematic block diagram of an image projection system 100 in accordance with one or more embodiments.

FIG. 1 is a schematic block diagram of an image projection system 100 in accordance with one or more embodiments. The image projection system 100 comprises an eye-tracking system that enables dynamic foveated rendering of the projected image. The image projection system 100 includes an RGB light unit 10 (i.e., a first transmitter) having plurality of light sources, including red (R), green (G), and blue (B) monochromatic light sources (e.g., laser diodes or light emitting diodes). The RGB light unit 10 is configured to generate red, green, and blue light beams in the visible light spectrum corresponding to image data to be projected onto the retina of a user's eye. The RGB light unit 10 is configured to transmit the red, green, and blue light beams towards a scanning system 20. Each RGB light pulse may be representative of an image pixel of an RGB image. Each RGB light pulse may comprise any combination of a red light pulse, a green light pulse, and/or a blue light pulse emitted simultaneously, including one, two, or three colors in combination at controlled intensities according to the desired pixel hue of the respective image pixel. Accordingly, an RGB light pulse may be referred to as a pixel light pulse.

The scanning system 20 has a coaxial architecture in that a transmission path is shared with a reception path. In other words, the components of the scanning system are used both to transmit light at a user's eye, and to receive reflected light or backscattered light from the user's eye in the form of sensor data. The scanning system 20 includes a first microelectromechanical system (MEMS) mirror 21, a first beam collimator 22 (i.e., a first collimation lens), a second beam collimator 23 (i.e., a second collimation lens), and a second MEMS mirror 24. The first beam collimator 22 and the second beam collimator 23 for a relay optics system between the two MEMS mirrors 21 and 24 for transmitting lights beams (i.e., RGB light beams and infrared (IR) light beams) therebetween. However, the relay optics system is optional such that free-space propagation between the two MEMS mirrors 21 and 24 may be used. Additionally, another type of relay optics system may be used and is not limited to two collimators. Furthermore, because the scanning system 20 has a coaxial architecture, both MEMS mirrors 21 and 24 act both as transmission mirrors and a receiver mirrors.

A MEMS mirror is a mechanical moving mirror (i.e., a MEMS micro-mirror) integrated on a semiconductor chip (not shown). The MEMS mirrors may be suspended by mechanical springs (e.g., torsion bars) or flexures and is configured to rotate about a single axis and can be said to have only one degree of freedom for movement. For example, MEMS mirror 21 may be configured to oscillate on an x-axis to perform horizontal scanning, whereas MEMS mirror 24 may be configured to oscillate on a y-axis (i.e., orthogonal to the x-axis) to perform vertical scanning. Due to this single axis of rotation, a MEMS mirror is referred to as a 1D MEMS mirror. Together, the two MEMS mirrors 21 and 24 are able to perform scanning in two-dimensions (2D) and may be used for Lissajous scanning operations.

Because the scanning system 20 is a 2D scanning system, the light beams have a dot shape that are transmitted into a user's field of view, with higher resolution being directed towards the retina of a user, and, more particularly, towards the fovea of the user.

A MEMS mirror itself is a non-linear resonator (i.e., a resonant MEMS mirror) configured to oscillate "side-to-side" about a scanning axis such that the light reflected from the MEMS mirror oscillates back and forth in a scanning direction (e.g., a horizontal scanning direction or a vertical scanning direction). A scanning period or an oscillation period is defined, for example, by one complete oscillation from a first edge of a field of view (e.g., first side) to a second edge of the field of view (e.g., second side) and then back again to the first edge. A mirror period of a MEMS mirror corresponds to a scanning period.

Thus, the field of view is scanned in both scanning directions by changing the angle θ of each MEMS mirror on its respective scanning axis. For example, the MEMS mirror 21 may be configured to oscillate at a resonance frequency of 2 kHz at a predetermined angular range to steer the light over a scanning range. Thus, the field of view may be scanned, line-by-line, by a rotation of the MEMS mirror through its degree of motion. One such sequence through the degree of motion (e.g., from −15 degrees to +15 degrees) is referred to as a single scan or scanning cycle.

Alternatively, it will be further appreciated that it is also possible that one of the MEMS mirrors 21 or 24 is configured as a 2D MEMS mirror having two scanning axes (i.e., an x-axis and a y-axis) and the other mirror is a configured as a fixed reflective structure. For example, MEMS mirror 21 may be replaced with a fixed reflective structure and MEMS mirror 24 may be configured as a 2D MEMS mirror whose deflection position is controlled by driving the mirror on two axes. In this case, both axes of a single 2D MEMS mirror are controlled by a different phase-locked loops (PLLs) such that a first scanning direction according to a first axis and a second scanning direction according to a second axis are separately controllable in terms of both driving amplitude and driving frequency. Or the system can even be built without mirror 21 by relocating the RGB unit 10 in a way to direct the light beam onto the 2D scanning mirror 24.

The same can be said when using two 1D MEMS mirrors—both MEMS mirrors are separately controllable in terms of both driving amplitude and driving frequency. In this example, the scanning system 20 includes two MEMS drivers 61 and 64 that are configured to drive a respective one of MEMS mirror 21 and MEMS mirror 24 according to a respective driving waveform. The deflection angle of each MEMS mirrors 21 and 24 continuously varies over time based on its driving waveform. Alternatively, circuitry for driving each MEMS mirror may be combined into a single MEMS driver (e.g., comprising two PLL circuits). Therefore, it will be understood that any functionality performed by either of the MEMS drivers 61 and 64 may also be performed by a single MEMS driver.

The scanning frequency of MEMS mirror 21 may be set higher than the scanning frequency of MEMS mirror 24. For this reason, MEMS mirror 21 may be referred to as a "fast" mirror and MEMS mirror 24 may be referred to as a "slow" mirror. Additionally, the deflection angle (i.e., the tilt angle) of each mirror may follow a different pattern. For example, the deflection angle of MEMS mirror 21 may follow a sinusoidal pattern at a higher frequency and the deflection angle of MEMS mirror 24 may follow a saw-tooth pattern at a lower frequency. This results in the MEMS mirror 21 having a faster rate of change about its scanning axis in comparison to MEMS mirror 24. Additionally, the deflection angle of one or both mirrors may be modulated based on a detected and tracked fovea position, to be described in more detail below.

As noted above, the RGB light unit 10 transmits the red, green, and blue light beams towards a scanning system 20. The RGB light beams may be coupled into a transmission path via respective optical beam splitters 11R, 11G, and 11B that have a high reflectivity with to their respective RGB light beam. The RGB light beams may pass through an optical beam splitter 12 that has a high transmittivity with respect to the RGB light beams. The scanning system 20 is configured to receive the RGB light beams and steer the RGB light beams in a 2D projection plane using the two scanning axes to create an RGB image.

In particular, the scanning system 20 directs the RGB light at a waveguide 30 comprising a couple-in grating 32 and a couple-out grating 34. The couple-in grating 32 couples light (e.g., RGB light and IR light) into the waveguide 30. The coupled-in light travels along the waveguide 30 via internal refraction towards the couple-out grating 34, which couples out the light. The couple-out grating 34 projects the coupled-out light into a field of view of a user's eye, and, more particularly, projects the coupled-out light onto the user's eye. Thus, the waveguide 30 is responsible for coupling in an RGB image formed by RGB light and then projecting the RGB image into an eye of a user by coupling out the RGB image into the field of view of the user's eye. In other words, the waveguide 30 delivers RGB images generated by the RGB light unit 10 to the user's eye in accordance with a controlled system resolution that is adjusted based on the detected and tracked fovea position.

The image projection system 100 further includes an eye-tracking sensor 40 that, together with the scanning system 20, forms a retina scanner. The eye-tracking sensor 40 includes an IR light source 41 (i.e., a second transmitter), such as a laser diode or a light emitting diode, that generates and transmits IR light beams. The IR light source 41 may be a Near Infrared (NIR) laser source that generates laser pulses in the near-infrared region of the electromagnetic spectrum (e.g., from 780 nm to-1350 nm). The sensor 40 further includes an optical beam splitter 42 that has a high transmittivity with respect to the IR light beams. The optical beam splitter 12 is configured to receive the IR light beams from the IR light source 41, and couple the IR light beams via high reflectivity into the transmission path. The scanning system 20, arranged on the transmission path, receives both RGB light beams and the IR light beams. With regard to the sensor function, the scanning system 20 applies the 2D scanning function of MEMS mirrors 21 and 24 to the IR light beams to scan a retina of a user's eye. This scanning occurs simultaneously, and thus in parallel, to the projection of the RGB image onto the user's eye.

The IR light beams are reflected back from the user's eye, reflected in part by the retina and further in part by the fovea. The backscattered IR light is coupled back into the waveguide 30 and guided back to the sensor 40 to a light detector 43 (e.g., a photodetector such as a photodiode). The waveguide 30, the scanning system 20, and the optical beam splitter 12 are arranged on a return path (i.e. a receive path) of the backscattered IR light that represents sensor data of the user's eye. In particular, the sensor data can be used by a signal processor to generate an image of a user's eye, and specifically of a user's retina.

The optical beam splitter 12 has a high reflectivity for reflecting the backscattered IR light and directing it towards the optical beam splitter 42. Likewise, the optical beam splitter 42 has a high reflectivity for reflecting the backscattered IR light and directing it towards the light detector 43. The light detector 43 is configured to receive the backscattered IR light and generate electrical signals in response thereto. Since the time of transmission of each light pulse from the IR light source 41 is known, and because the light travels at a known speed, a time-of-flight computation using the electrical signals can determine the distance of objects from the light detector 43. A depth map of a user's eye can be generated from the distance information. A 2D reflectivity map (image of the retina) can be generated by detecting the amplitude of electrical signals generated by light reflected at the retina.

For example, the sensor 40 includes sensor circuitry 44 including an ADC 45 and a digital signal processor (DSP) 46. The ADC 45 may be used for signal detection and ToF measurement. For example, an ADC 45 may be used to detect an analog electrical signal from the light detector 43 to estimate a time interval between a start signal (i.e., corresponding to a timing of a transmitted light pulse) and a stop signal (i.e., corresponding to a timing of receiving an analog electrical signal at the ADC 45) with an appropriate algorithm. The DSP 46 is configured to receive the digital signals from the ADC 45 and preform single-channel data processing to generate a retina image and then further perform image processing to perform eye-tracking.

The DSP 46 determines the time-of-flight and thus the distance information corresponding to each IR light pulse transmitted by the IR light source 41. Using position information corresponding to each MEMS mirror 21 and 24 (i.e., an x-y coordinate of transmitted IR light projected in 2D space onto a user's eye), the DSP 46 can map the depth and position of each transmitted IR light pulse to generate a depth map, and, more particularly, a retina image. The DSP 46 is further configured to analyze the retina image to detect the focal direction of the eye. More specifically, the DSP 46 is configured to analyze the retina image to detect and track the fovea within the retina image. The DSP 46 is configured to generate tracking information, including retina tracking information and/or fovea tracking information, and provide the tracking information to a system controller 50. The tracking information may include real-time position information of the fovea within the retina image. The fovea position information may be in the form of x-y coordinates, an identified region-of-interest (ROI)) within the retina image, an x-axis angular range (e.g., corresponding to MEMS mirror 21) in which the fovea is located, and/or a y-axis angular range (e.g., corresponding to MEMS mirror 24) in which the fovea is located. They system controller 50 is configured to perform one or more control functions based on the received tracking information.

The system controller 50 is configured to control components of the image projection system 100, including control of the IR light source 41, the RGB light sources of the RGB light unit 10, and the MEMS drivers 61 and 64. Thus, the system controller 50 includes control circuitry, such as a microcontroller, that is configured to generate control signals. In some examples, the system controller 50 may incorporate the DSP 46, a portion thereof, or may include additionally processing circuitry for generating and/or analyzing retina image data, tracking a fovea, and the like. The control signals may be used to control a function of the transmitter 10 (i.e., a function of the RGB light sources 11), a timing of firing light pulses by the IR light source 41, the oscillation frequency, oscillation pattern, and the oscillation range (angular range of motion) of the MEMS mirrors 21 and 24, and/or a driving waveform of the MEMS drivers 61 and 64. Thus, the system controller 50 may include at least one processor and/or processor circuitry (e.g., comparators and digital signal processors (DSPs)) of a signal processing chain for processing data, as well as control circuitry, such as a microcontroller, that is configured to generate control signals.

MEMS drivers 61 and 64 are configured to drive MEMS mirror 21 and MEMS mirror 24, respectively. In particular, each MEMS driver 61, 64 actuates and senses the rotation position of its MEMS mirror about its scanning axis, and provides position information (e.g., tilt angle or degree of rotation about the scanning axis) of the mirror to the system controller 50. Thus, each MEMS driver 61, 64 includes a measurement circuit configured to measure the rotation position of its MEMS mirror 21, 24.

For example, an actuator structure that is used to drive a respective MEMS mirror 21, 24 may be a comb-drive rotor and stator that include two drive capacitors whose capacitance or stored charge is deflection angle dependent. Thus, the measurement circuit may determine the rotation position by measuring the capacitances of the drive capacitors or their stored charges.

Based on this position information, the system controller 50 may control one or more system functions in combination with the tracking information received from the DSP 46. The controllable functions based on fovea detection and tracking will now be described in more detail.

Figure 2A:
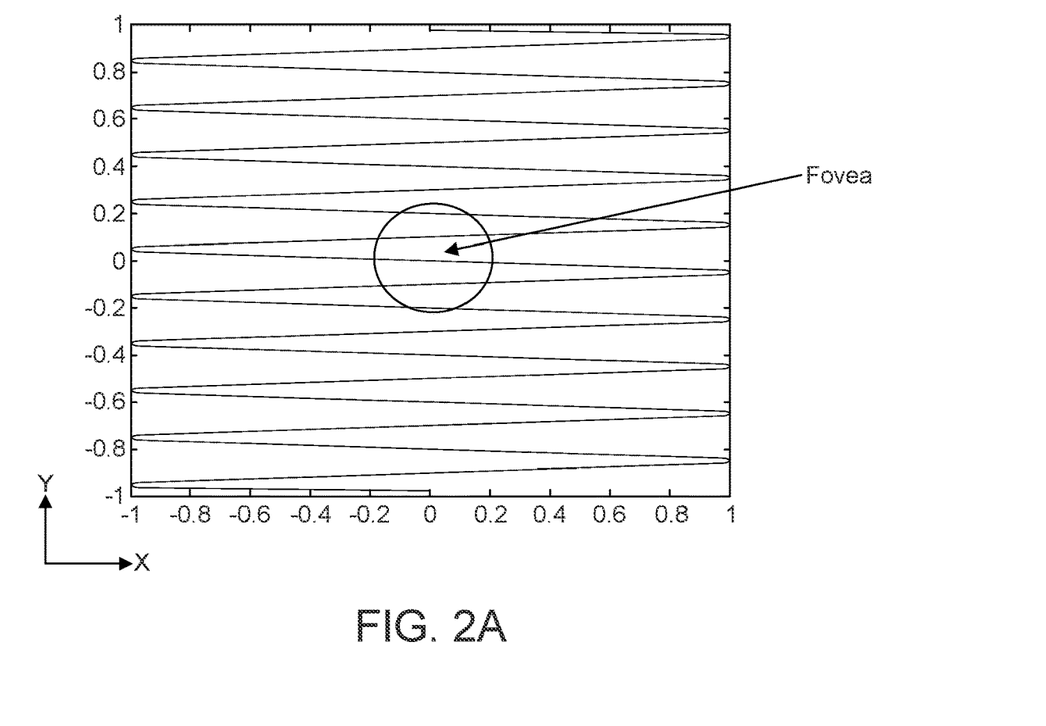
FIGS. 2A and 2B illustrate two scanning patterns in a 2D scanning plane according to one or more embodiment.
Figure 2B:
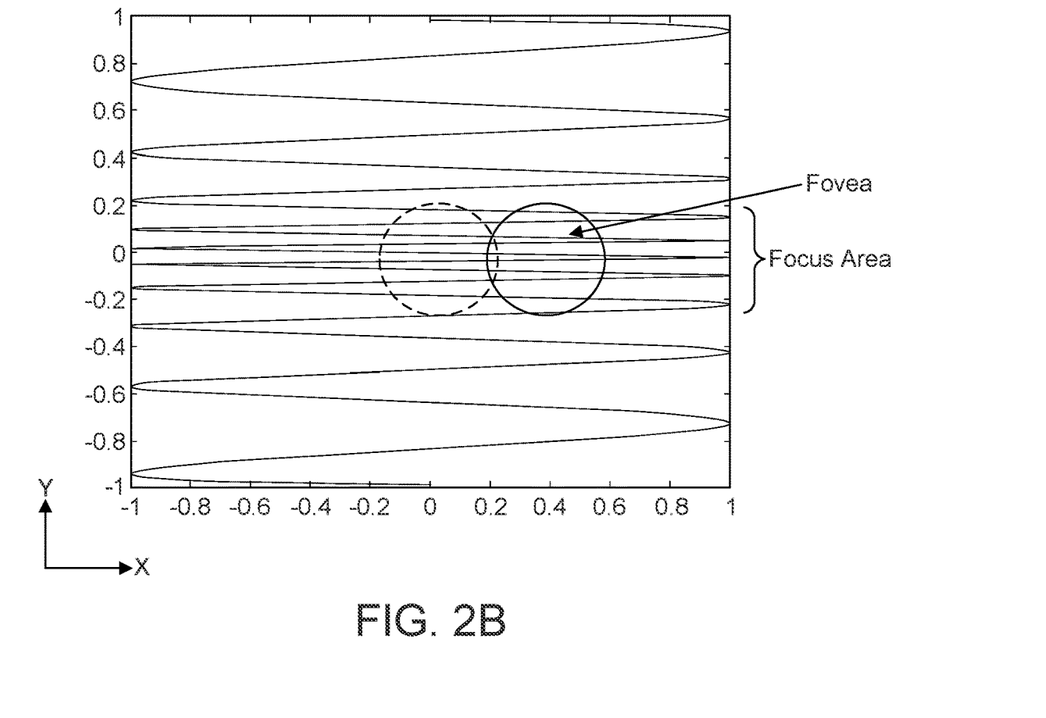

FIGS. 2A and 2B illustrate two Lissajous scanning patterns in a 2D scanning plane according to one or more embodiment. The 2D scanning plane is defined by an angular range of the MEMS mirror 21 between two angular extrema in the horizontal scanning direction (e.g., between a left edge and a right edge defined in the x-direction) and by an angular range of the MEMS mirror 24 between two angular extrema in the vertical scanning direction (e.g., between a top edge and a bottom edge defined in y-direction). IR light and RGB light are projected onto an eye according to preprogrammed scanning pattern (e.g., a raster or a Lissajous pattern), where light pulses track the pattern or a Lissajous pattern.

FIG. 2A corresponds to a first scan of an eye (i.e., of a retina) used for eye detection and fovea detection. Here, scanning pattern is uniform such that the sine wave pattern is uniform in the y-direction indicating a constant rate of change (i.e., oscillation speed) in the y-direction. Upon detecting a location of the fovea, the system controller 50 is configured to switch to foveated scanning, represented by FIG. 2B. Thus, FIG. 2B corresponds to a subsequent scan initialized once the location of the fovea is determined.

In FIG. 2B, the scanning pattern is modified in the y-direction such that the pattern density of the scan is increased in a region of the 2D scanning plan that corresponds with the determined fovea location. To modulate the scanning pattern, the system controller adjusts the driving waveform of MEMS driver 64 that drives MEMS mirror 24. For example, the rate of change in the y-direction may be decreased in the y angular range that corresponds to the location of the fovea such that a higher number of scans (oscillations) is performed by MEMS mirror 21 in that region. This effectively increases the scanning density (i.e., resolution) in that y angular range.

Since the IR scanner and the RGB imager share the same scanning system 20, increasing the scanning density also increases the image resolution of the RGB image projected into the user's eye. Thus, projection of the RGB image is rendered accordingly. Increasing the scanning density or resolution also enhances fovea detection and tracking by the sensor 40, thereby increasing the precision of the localizing of the fovea.

Additionally, the rate of change in the y-direction may be increased in the y angular range that corresponds to locations located away from or distant to the fovea such that a lower number of scans (oscillations) is performed by MEMS mirror 21 in that region. This effectively decreases the scanning density (i.e., resolution) in that y angular range. Since the IR scanner and the RGB imager share the same scanning system 20, decreasing the scanning density also decreases the image resolution of the RGB image projected into the user's eye. Thus, projection of the RGB image is rendered accordingly.

The scanning density may be gradually increased from a region located distant to the fovea as the scanning coordinates move towards a focus area in which the fovea is located, and gradually decreased as the scanning coordinates move away from the focus area in which the fovea is located.

It is noted that the scanning pattern of MEMS mirror 21 remains fixed (i.e., the MEMS mirror's driving waveform is fixed) while the scanning pattern of MEMS mirror 24 is adjusted based on fovea location. However, it will be further appreciated that the scanning pattern of MEMS mirror 21 (e.g. its driving waveform) can also be modulated by the system controller 50 to further define the focus area of the scanning pattern.

Accordingly, the system controller 50 is configured to track the fovea based on tracking information provided by the DSP 46 and adjust a focus area of the scanning pattern in which the scanning density is increased such that the focus area is defined in the scanning pattern. The location of the focus area is adjusted to coincide with the tracked location of the fovea. The focus area is adjusted in real-time to follow any changes in location of the fovea. For example, the focus area may be shifted up or down in the y-direction based on the detected fovea location by adjusting the driving waveform of MEMS mirror 24. The scanning pattern can be adjusted after each scan such that the scanning pattern for the next scan is updated based on the detected fovea location. Alternatively, the scanning pattern can be adjusted mid-scan in response to detecting the location of the fovea. For example, the driving waveform of the MEMS mirror 24 can be adjusted on a period-by-period basis.

Additionally, or alternatively, the system controller 50 may adjust the resolution of the RGB image by modulating the RGB light pulses to render a higher resolution in the fovea region of the RGB image and to render a lower resolution in the RGB image in areas outside of the fovea region. The RGB light pulses may be modulated in pulse width, in transmission frequency (i.e., the frequency in timing of light pulses—more frequent or less frequent), in brightness, or any combination thereof. To avoid confusion with spectrum frequency, transmission frequency may be referred to as pulse rate.

Figure 3A:
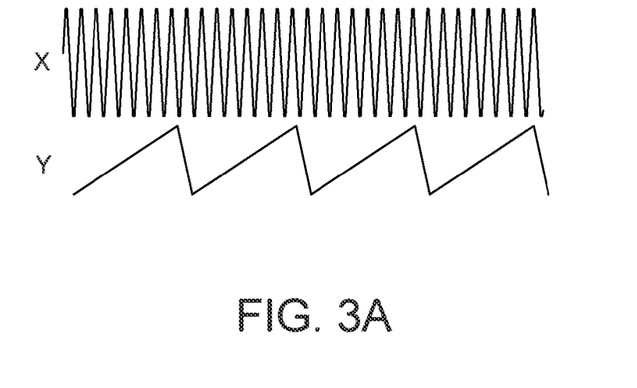
FIG. 3A shows MEMS mirror driving waveforms for scanning according to one or more embodiments.

FIG. 3A shows MEMS mirror driving waveforms for Lissajous scanning according to one or more embodiments. In particular, the top waveform is a driving waveform for MEMS mirror 21 for horizontal scanning in the x-direction and the bottom waveform is a driving waveform for MEMS mirror 24 for vertical scanning in the y-direction. As can be seen, the X driving waveform of MEMS mirror 21 is sinusoidal and has a higher oscillation rate compared to the Y driving waveform of MEM mirror 24, which has a saw-tooth waveform. Accordingly, the MEMS mirror 21 oscillates a plurality of times within an oscillation (scanning) period of MEMS mirror 24.

Figure 3B:
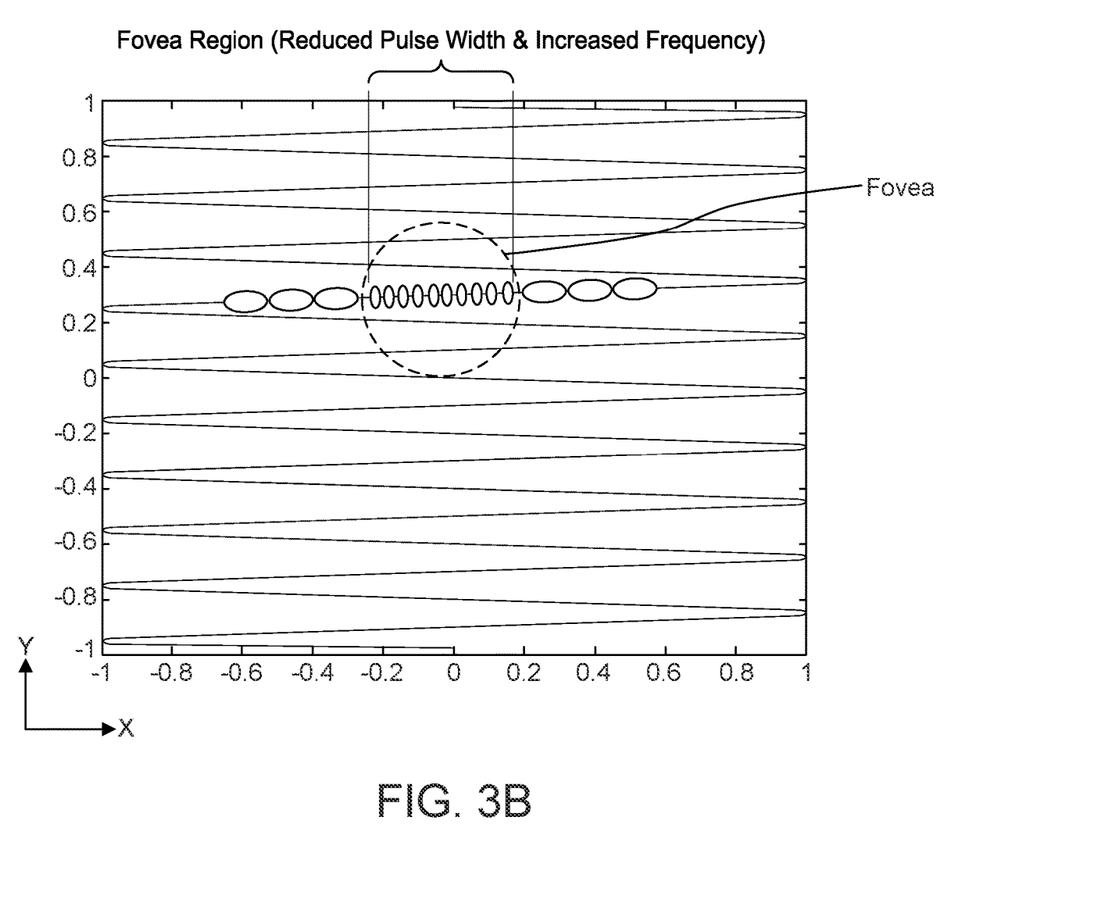
FIG. 3B shows a scanning pattern generated based on the MEMS mirror driving waveforms shown in FIG. 3A.

FIG. 3B shows a Lissajous scanning pattern generated based on the MEMS mirror driving waveforms shown in FIG. 3A. In addition, RGB laser pulses are shown in the 2D projection plane overlain on a portion of the scanning pattern. The system controller 50 is configured to modulate the pulse width, the pulse rate, and/or a laser driving current bandwidth of the RGB laser pulses depending on whether the RGB pulses are being transmitted within the fovea region or outside of the fovea region. The power of the RGB lasers can also be modulated, with higher brightness (i.e., higher power) being triggered by the system controller 50 for pulses fired within the fovea region and lower brightness being triggered by the system controller 50 for pulses fired outside of the fovea region. The laser driving current bandwidth is the frequency range that can be supported without having a significant change in the output and is dependent on the analog modulation method applied to the light source—where analog modulation means that the waveform is continuously varying in amplitude.

The fovea region of the RGB image is an ROI that coincides with the detected location of the fovea, and may also be referred to as a focus region. In this case, the system controller 50 may reduce a pulse width of the RGB light pulses, increase their pulse rate, and/or increase their laser driving current bandwidth when transmitting the fovea region of the RGB image. Brightness could also be increased. These reduced-width, higher pulse rate, higher current bandwidth RGB light pulses are transmitted based on a scanning positions of MEMS mirrors 21 and 24. For instance, reduced-width, higher pulse rate RGB light pulses or reduced-width, higher current bandwidth RGB light pulses are transmitted when the angular position of MEMS mirror 21 and the angular position of MEMS mirror 24 about their respective scanning axes match the x-y coordinates of the fovea region. Thus, the RGB image has a higher resolution in an area that is projected onto the fovea, and has a lower resolution in areas that are projected onto other areas of the eye.

Different discrete levels of resolution may be defined in this manner. For example, a highest resolution may be rendered in the fovea region, a second intermediate resolution may be rendered (e.g., via the an intermediate pulse width, intermediate brightness, an intermediate pulse rate, and/or intermediate laser driving current bandwidth) in a region adjacent to and concentric with the fovea region, and a lowest resolution may be rendered (e.g., via the largest pulse width, lowest brightness, the lowest transmission pulse rate, and/or the lowest laser driving current bandwidth) at a peripheral region of the retina. Thus, any combination of pulse width, pulse brightness, pulse rate, and laser driving current bandwidth may be used to define different discrete levels of RGB image resolution. The system controller 50 adjusts both parameters via control signals sent to the RGB light unit 10 by referring both to the MEMS mirror position information and the fovea tracking information.

Thus, eye tracking/fovea tracking via the DSP 46 defines the location of a high resolution (foveated) area, and the horizontal resolution can be tuned by a laser-pulse width. In addition, the brightness of a pixel can be independently set by adjusting a peak current, a bandwidth of the current, and/or a duty cycle for each RGB light source.

Figure 4A:
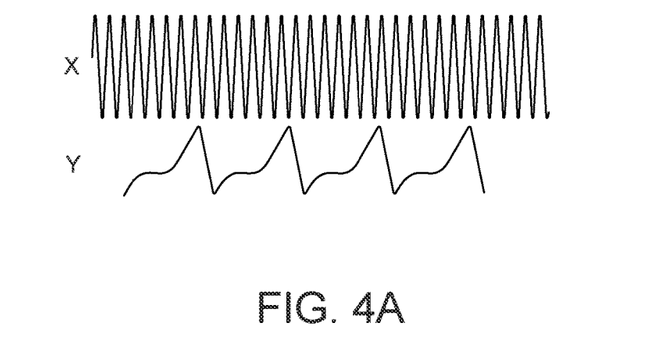
FIG. 4A shows MEMS mirror driving waveforms for scanning according to one or more embodiments.
Figure 4B:
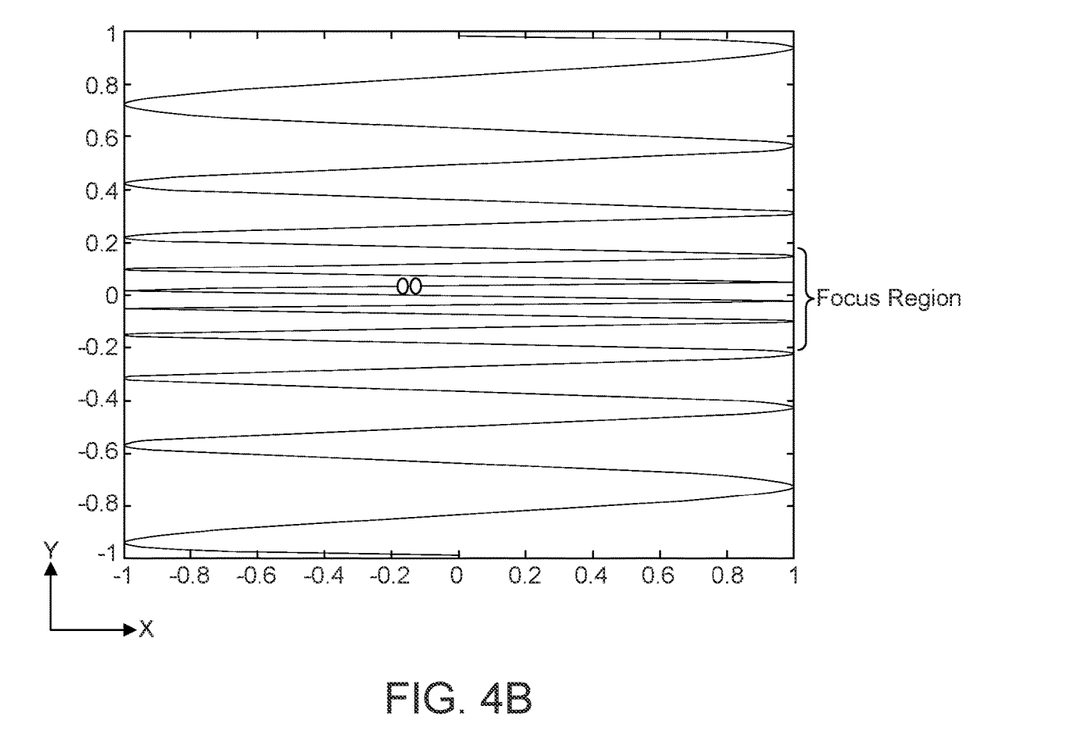
FIG. 4B shows a scanning pattern generated based on the MEMS mirror driving waveforms shown in FIG. 4A.

FIG. 4A shows MEMS mirror driving waveforms for Lissajous scanning according to one or more embodiments. In particular, the top waveform is a driving waveform for MEMS mirror 21 for horizontal scanning in the x-direction and the bottom waveform is a driving waveform for MEMS mirror 24 for vertical scanning in the y-direction. As can be seen, the X driving waveform of MEMS mirror 21 is sinusoidal and has a higher oscillation rate compared to the Y driving waveform of MEMS mirror 24, which has an adjustable saw-tooth waveform. Accordingly, the MEMS mirror 21 oscillates a plurality of times within an oscillation (scanning) period of MEMS mirror 24. Here, the slope (i.e., rate of change) of the Y driving waveform is adjusted based on the location of the fovea region. This results in an adjustment to the rotational speed of MEMS mirror 24. FIG. 4B shows a Lissajous scanning pattern generated based on the MEMS mirror driving waveforms shown in FIG. 4A.

According to this example, the slope of the rising edge of the Y driving waveform is adjusted to be higher when the scanning pattern is outside of the fovea region and lower when the scanning pattern is inside of or overlaps with the fovea region. Thus, the system controller 50 decreases the slope of the Y driving waveform, thereby slowing down the rotational movement of the MEMS mirror 24 when its angular position about its scanning axis coincides with the angular range of the fovea region. In contrast, the X driving waveform remains fixed. As a result, a higher number of oscillations are performed by the MEMS mirror 21 relative to the angular change of MEMS mirror 24, thereby creating a focus region in the scanning pattern having a higher pattern density. The higher pattern density produces a higher resolution for that region of the RGB image.

In addition, the system controller 50 increases the slope of the Y driving waveform when the angular position of the MEMS mirror 24 coincides with the angular range of a peripheral region of the retina. As a result, a lower number of oscillations are performed by the MEMS mirror 21 in this region, thereby creating a region in the scanning pattern having a lower pattern density. The lower pattern density produces a lower resolution for that region of the RGB image. Different discrete levels of resolution may be defined in this manner.

The system controller 50 may also adjust the emission timing of the RGB light pulses, with an increased pulse rate within the focus region of the scanning pattern and a decreased pulse rate outside of the focus region of the scanning pattern. It is noted that the refresh rate and the total number of scan lines is unchanged. Instead, the number of scan lines is compressed in the focus region and more widely spread apart outside of the focus region. The spacing between scan lines may gradually increase with distance from a center of the focus region (i.e., a center of the fovea) or may be fixed within the focus region and may gradually increase with distance from top and bottom edges of the focus region.

The system controller 50 may also adjust the intensity or brightness of the RGB light pulses based on similar criteria described above.

In view of the above, the eye-tracking system within the image projection system 100 can be used for dynamic foveated rendering that follows the user's gaze using eye tracking, and, more specifically, fovea tracking, and a renders a sharp image wherever the user's retinas are looking. A highest resolution of an image is rendered onto the fovea using the above-described techniques, whereas lower resolutions are renders outside of the fovea region. Such a system may be used in XR systems where the waveguide 30 is a smart eye-glass, a smart contact lens, a head-up display (HUD), a head-mounted display (HMDs), or the like.

Although embodiments described herein relate to MEMS devices with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An image projection system, comprising:
   a first transmitter configured to generate pixel light pulses and transmit the pixel light pulses along a transmission path to be projected onto an eye to render a projection image thereon;
   a second transmitter configured to generate infrared (IR) light pulses transmitted along the transmission path and to be projected onto the eye and reflected back therefrom as reflected IR light pulses on a reception path;
   a coaxial scanning system arranged along the transmission path and the reception path, the coaxial scanning system comprising at least one oscillator structure that enables the coaxial scanning system to steer the pixel light pulses and the IR light pulses in a first scanning direction and in a second scanning direction according to a scanning pattern;
   an eye-tracking sensor configured to receive the reflected IR light pulses from the coaxial scanning system, generate a retina image of the eye based on the reflected IR light pulses, and process the retina image to determine a location of a fovea region of the eye; and
   a system controller configured to render the projection image based on the location of the fovea region, wherein the projection image is rendered with a higher resolution in the fovea region and is rendered with a lower resolution outside of the fovea region.

2. The image projection system of claim 1, wherein the coaxial scanning system is configured to steer the pixel light pulses in the first scanning direction and in the second scanning direction to render the projection image, and to steer the IR light pulses in the first scanning direction and in the second scanning direction to perform retina scanning.

3. The image projection system of claim 1, wherein the system controller is configured to control the first transmitter to decrease a pulse width and increase at least one of a pulse rate or a laser driving current bandwidth for a first portion of the pixel light pulses projected onto the fovea region, and control the first transmitter to increase the pulse width and decrease at least one of the pulse rate or the laser driving current bandwidth for at least a second portion of the pixel light pulses projected outside of the fovea region.

4. The image projection system of claim 1, wherein the system controller is configured to control the first transmitter to increase an intensity of the pixel light pulses for a first portion of the pixel light pulses projected onto the fovea region, and control the first transmitter to decrease the intensity of the pixel light pulses for at least a second portion of the pixel light pulses projected outside of the fovea region.

5. The image projection system of claim 4, wherein the first transmitter comprises a plurality of monochromatic light sources and the system controller is configured to control the intensity of the pixel light pulses by independently adjusting a peak and a bandwidth of current or a duty cycle of each of the plurality of monochromatic light sources.

6. The image projection system of claim 1, wherein the system controller is configured to control the coaxial scanning system to increase a pattern density of the scanning pattern in a first region of the scanning pattern that corresponds with the fovea region, and to control the coaxial scanning system to decrease the pattern density of the scanning pattern in at least a second region of the scanning pattern that does not correspond with the fovea region.

7. The image projection system of claim 1, wherein the first transmitter is a red-green-blue (RGB) transmitter comprising a red light source, a green light source, and a blue light source, and the projection image is an RGB image.

8. The image projection system of claim 1, wherein each of the at least one oscillator structure has at least one deflection angle that continuously varies over time.

9. The image projection system of claim 1, wherein the at least one oscillator structure comprises:
   a first oscillator structure configured to oscillate about a first scanning axis at a first scanning frequency to steer the pixel light pulses and the IR light pulses in the first scanning direction; and
   a second oscillator structure configured to oscillate about a second scanning axis at a second scanning frequency to steer the pixel light pulses and the IR light pulses in the second scanning direction.

10. The image projection system of claim 1, wherein coaxial scanning system comprises a coaxial path that is shared by the transmission path and the reception path such that the pixel light pulses, the IR light pulses, and the reflected IR light pulses travel on the coaxial path, wherein the pixel light pulses and the IR light pulses travel through the coaxial scanning system on the coaxial path towards the eye and the reflected IR light pulses travel through the coaxial scanning system on the coaxial path away from the eye.

11. The image projection system of claim 9, wherein the first scanning frequency is greater than the second scanning frequency.

12. The image projection system of claim 9, wherein the coaxial scanning system comprises:
   a first driver circuit configured to drive the first oscillator structure according to a first driving waveform that is fixed; and
   a second driver circuit configured to drive the second oscillator structure according to a second driving waveform that is adjustable.

13. The image projection system of claim 12, wherein the first driving waveform is a sine wave and the second driving waveform is a saw-tooth wave.

14. The image projection system of claim 12, wherein the system controller is configured to adjust the second driving waveform based on the location of the fovea region.

15. The image projection system of claim 14, wherein the system controller is configured to decrease a slope of the second driving waveform when a deflection angle of the second oscillator structure is within an angular range that corresponds to the location of the fovea region, and increase the slope of the second driving waveform when the deflection angle of the second oscillator structure is outside the angular range that corresponds to the location of the fovea region.

16. The image projection system of claim 9, wherein the system controller is configured to dynamically adjust a rotational speed of the second oscillator structure in real-time based on the location of the fovea region.

17. The image projection system of claim 16, wherein the system controller is configured to adjust the rotational speed of the second oscillator structure such that a pattern density of the scanning pattern is increased in a first region of the scanning pattern that corresponds with the fovea region and decreased in at least a second region of the scanning pattern that does not correspond with the fovea region.

18. The image projection system of claim 17, wherein the system controller is configured to decrease the rotational speed of the second oscillator structure in the first region of the scanning pattern that corresponds with the fovea region and increase the rotational speed of the second oscillator structure in at least a second region of the scanning pattern that does not correspond with the fovea region.

19. A method of projecting an image based on fovea tracking, the method comprising:
  transmitting pixel light pulses along a transmission path to be projected onto an eye to render a projection image thereon;
  transmitting infrared (IR) light pulses along the transmission path, the IR light pulses being projected onto the eye and reflected back therefrom as reflected IR light pulses on a reception path;
  steering the pixel light pulses and the IR light pulses in a first scanning direction and in a second scanning direction according to a scanning pattern;
  sensing the reflected IR light pulses received from the reception path;
  generating a retina image of the eye based on the reflected IR light pulses;
  processing the retina image to determine a location of a fovea region of the eye; and
  rendering the projection image based on the location of the fovea region, wherein the projection image is rendered with a higher resolution in the fovea region and is rendered with a lower resolution outside of the fovea region.

20. The method of claim 19, wherein rendering the projection image based on the location of the fovea region comprises:
  decreasing a pulse width and increasing at least one of a pulse rate or a laser driving current bandwidth for a first portion of the pixel light pulses projected onto the fovea region; and
  increasing the pulse width and decreasing at least one of the pulse rate the laser driving current bandwidth for at least a second portion of the pixel light pulses projected outside of the fovea region.

21. The method of claim 19, wherein rendering the projection image based on the location of the fovea region comprises:
  increasing an intensity of the pixel light pulses for a first portion of the pixel light pulses projected onto the fovea region; and
  decreasing the intensity of the pixel light pulses for at least a second portion of the pixel light pulses projected outside of the fovea region.

22. The method of claim 19, wherein rendering the projection image based on the location of the fovea region comprises:
  increasing a pattern density of the scanning pattern in a first region of the scanning pattern that corresponds with the fovea region; and
  decreasing the pattern density of the scanning pattern in at least a second region of the scanning pattern that does not correspond with the fovea region.

* * * * *